(12) United States Patent
Young et al.

(10) Patent No.: US 8,994,985 B2
(45) Date of Patent: Mar. 31, 2015

(54) SYSTEMS AND METHODS FOR UPDATING PRINTING DEVICE CAPABILITIES

(75) Inventors: Chihsin Steven Young, Irvine, CA (US); Charles Thomas Armstrong, Rancho Santa Margarita, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/010,531

(22) Filed: Jan. 20, 2011

(65) Prior Publication Data

US 2012/0188585 A1 Jul. 26, 2012

(51) Int. Cl.
*G06F 3/12* (2006.01)

(52) U.S. Cl.
CPC ............ *G06F 3/1205* (2013.01); *G06F 3/1255* (2013.01); *G06F 3/1285* (2013.01); *G06F 3/1256* (2013.01)
USPC ....................................................... 358/1.15

(58) Field of Classification Search
None
See application file for complete search history.

(56) References Cited

U.S. PATENT DOCUMENTS

| | | |
|---|---|---|
| 6,590,589 B1 | 7/2003 | Sluiman |
| 6,920,607 B1 | 7/2005 | Ali |
| 6,941,521 B2 | 9/2005 | Lin |
| 6,990,654 B2 | 1/2006 | Carroll |
| 7,386,835 B1 | 6/2008 | Desai |
| 2005/0204047 A1 | 9/2005 | Mitchell |
| 2006/0195794 A1 | 8/2006 | Sun |
| 2006/0221361 A1 | 10/2006 | Takagi |
| 2007/0115839 A1 | 5/2007 | Yang |
| 2007/0130205 A1 | 6/2007 | Dengler |
| 2008/0170254 A1 | 7/2008 | Shah |
| 2009/0063710 A1 | 3/2009 | Sekine |
| 2009/0091781 A1* | 4/2009 | Nishimura .................... 358/1.15 |
| 2010/0149579 A1* | 6/2010 | Shah et al. .................... 358/1.14 |
| 2011/0026072 A1* | 2/2011 | Xiao et al. .................... 358/1.15 |

OTHER PUBLICATIONS

JP-2008276744—translation, Nishimura, Nov. 13, 2008.*
JP2010072816—abstract.*
JP2010072816—translation, Hakozaki, Apr. 2, 2010.*
Microsoft, "PrintTicket and PrintCapabilities Support in Windows Print Drivers", Feb. 2006, pp. 1-23.
Microsoft, "Print Schema Specification," 2007, pp. 1-343.

* cited by examiner

*Primary Examiner* — Fan Zhang
(74) *Attorney, Agent, or Firm* — Canon U.S.A., Inc. IP Division

(57) ABSTRACT

Systems and methods that generate initial printing device capabilities data including one or more initial printing device capabilities based on the initial print ticket markup language data, receive second print ticket markup language data, generate updated printing device capabilities data including one or more updated printing device capabilities based on the second print ticket markup language data, and generate one or more changed printing device capabilities markup language data based on the initial printing device capabilities data and the updated printing device capabilities data, wherein the one or more changed printing device capabilities markup language data includes one or more changed printing device capabilities that indicate differences between the one or more initial printing device capabilities and the one or more updated printing device capabilities.

10 Claims, 8 Drawing Sheets

SYSTEMS AND METHODS FOR UPDATING PRINTING DEVICE CAPABILITIES

BACKGROUND

1. Field of the Disclosure

The present disclosure relates generally to determining the capabilities of a printing device.

2. Description of the Related Art

In the field of print processing, it is a challenging task for Independent Software Vendors (also referred to herein as "ISVs") to provide a consistent user interface for receiving a desired print intent from a user while supporting private settings for the printers of multiple Independent Hardware Vendors (also referred to herein as "IHVs"). The communication between the Windows® print sub system, an IHV's plug-in driver, and an ISV's application causes part of the difficulties, because the communication is done thru indexed based binary DevMode structures (also referred to herein as "DevMode") and binary DevCaps structures (also referred to herein as "DevCaps").

Microsoft® introduced a new XML based print schema to address the problems associated with communication between the print subsystem and external applications. The print schema technology uses an XML based public schema to describe printer capabilities, device configurations, and job formatting settings. Applications can use the XML based schema to provide print dialogs to change print settings.

Whenever a user changes a selected option for a setting, the changed setting and the respective option is added to a delta (also referred to herein as "Δ") PrintTicket and merged and validated with a specified base PrintTicket to produce a resulting PrintTicket, which is used to get a corresponding resulting PrintCapabilities document. The resulting PrintCapabilities document is then used to re-populate the user interface (also referred to herein as a "UI").

SUMMARY OF THE INVENTION

In one embodiment, a method for updating print capabilities of a printing device comprises receiving initial print ticket markup language data, generating initial printing device capabilities data including one or more initial printing device capabilities based on the initial print ticket markup language data, receiving second print ticket markup language data, and generating updated printing device capabilities data including one or more updated printing device capabilities based on the second print ticket markup language data. The method further comprises generating one or more changed printing device capabilities markup language data based on the initial printing device capabilities data and the updated printing device capabilities data, wherein the one or more changed printing device capabilities markup language data includes one or more changed printing device capabilities that indicate differences between the one or more initial printing device capabilities and the one or more updated printing device capabilities.

In one embodiment, a device for determining changes to print capabilities for a printer comprises a computer readable storage device, a processor, and a print driver configured to read one or more first print settings in a first print settings markup language file, generate first print capabilities data indicating one or more first print capabilities based on the one or more first print settings, and read one or more second print settings in a second print settings markup language file, the one or more second print settings including at least one print setting different than the one or more first print settings. The printer driver is further configured to generate resulting print capabilities data indicating one or more resulting print capabilities based on the one or more second print settings and the one or more first print settings, wherein the resulting print capabilities include a different print capability than the one or more first print capabilities, and generate delta print capabilities markup language data indicating delta print capabilities, wherein delta print capabilities include the different print capability than the one or more first print capabilities.

In one embodiment, a computer-readable storage medium stores instructions that, when executed by one or more computing devices, cause the one or more computing devices to perform operations comprising determining initial print capabilities based on initial print settings in an initial print settings file, generating resulting print settings by merging the initial print settings in the initial print settings file with second print settings in a second print settings file, determining resulting print capabilities based on the resulting print settings, determining changed print capabilities based on the resulting print capabilities and the initial print capabilities, and generating a resulting print file including the changed print capabilities.

DETAILED DESCRIPTION OF CERTAIN EMBODIMENTS

The following description is of certain illustrative embodiments, and the disclosure is not limited to these embodiments, but includes alternatives, equivalents, and modifications such as are included within the scope of the claims. Additionally, the illustrative embodiments may include several novel features, and a particular feature may not be essential to practice the systems and methods described herein.

Figure 1:
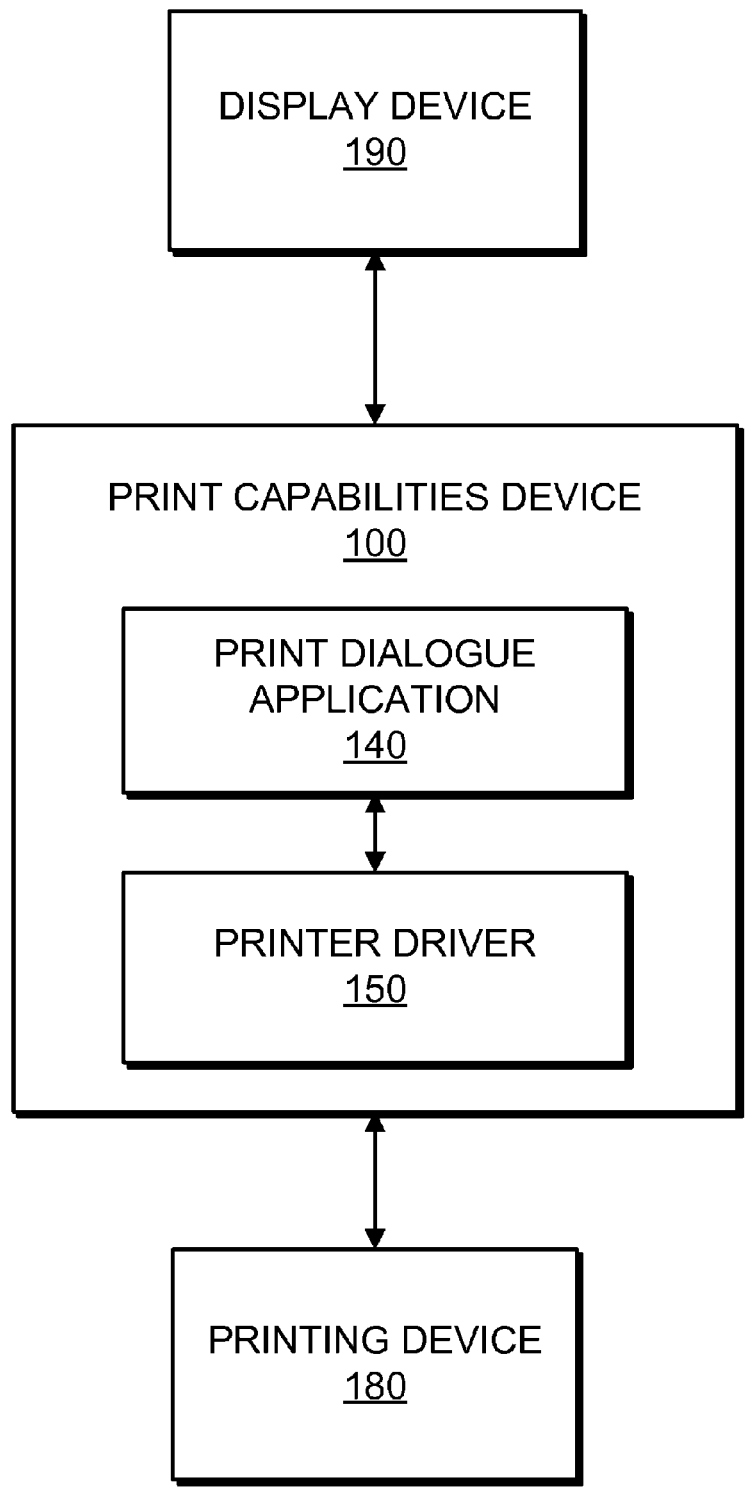
FIG. 1 is block diagram illustrating a system for determining changes to the capabilities of a printing device.

FIG. 1 is block diagram illustrating an embodiment of a system for determining changes to the capabilities of a printing device. The system includes a print capabilities device 100, a printing device 180, and a display device 190. The devices in the system may communicate via wired or wireless channels. The display device 190 has a display that is capable of rendering images, and the printing device 180 is configured to receive data and print images (e.g., text, graphics, photographs) on one or more print media (e.g., paper, cardboard, plastic) based on the received data. Additionally, the printing device 180 may print the images onto the print media according to one or more user adjustable settings.

Information is presented to a user via the display device 190, including information sent by the printing device 180. The print capabilities device 100 receives user provided information (e.g., user selections of print settings) and relays the information to the printing device 180.

The print capabilities device 100 includes a print dialogue application 140 and a printer driver 150. The print dialogue application 140 generates a user interface that presents information to the user and/or receives information from the user. The user interface may present the information in the form of a graphical interface that shows printer settings and capabilities and that receives user selections, such as selections of an option for a respective setting. The information may also be presented in any other manner that allows a user to view the information and/or select one or more options. The UI is sent to the display device 190, and the display device 190 presents the user interface to the user.

The printer driver 150 receives data, performs requested operations, and returns requested data (if any) to the print dialogue application 140. For example, the print dialogue application 140 invokes the functionality of the printer driver 150 via a function call, passes data to the printer driver 150 in the form of parameters of the function call, and receives the data returned by the function. The functions implemented by the printer driver 150 and the interface for calling the functions may conform to an application programming interface (API), for example the WinFX PT/PC, Win32 PT/PC, and PrintTicket APIs.

The printer driver 150 may convert received data into a format readable by the printing device 180. For example, the printer driver 150 may receive a print job from a software application, convert the print job into PDL data for the printing device 180, and transmit the PDL data to the printing device 180. The printer driver 150 also communicates with the printing device 180 about the settings and status of the printing device (e.g., paper, level, ink level, toner level, errors, selected paper size, colors).

The printer driver 150 may be configured with the relationships between the settings, capabilities, and selected settings options of the printing device 180. Thus, the printer driver 150 can determine which print capabilities are or are not available based on the selected options for one or more settings and determine which settings options are constrained based on the selected options for one or more settings.

For example, the printing driver 150 may be configured with the priorities of different settings and adjust printer capabilities according to respective selected options for the settings. Thus, if the selected option of a lower priority setting is changed, the printer driver 150 does not change the capabilities of the higher priority settings. However, if the selected option of a higher priority setting is changed, the printer driver 150 adjusts the capabilities of the lower priority setting(s), if necessary.

Following the above example, a printer driver may be configured to assign the print medium size setting a lower priority than the print medium type setting or the borderless printing setting. Thus, if the selected option for the print medium size setting is changed, the capabilities for the print medium type or borderless printing settings will not be changed because they are assigned a higher priority. However, if the option selected for the print medium type setting or the borderless printing setting is changed, then the capabilities for the print medium size (and other lower priority settings) will be changed, if necessary.

Figure 2:
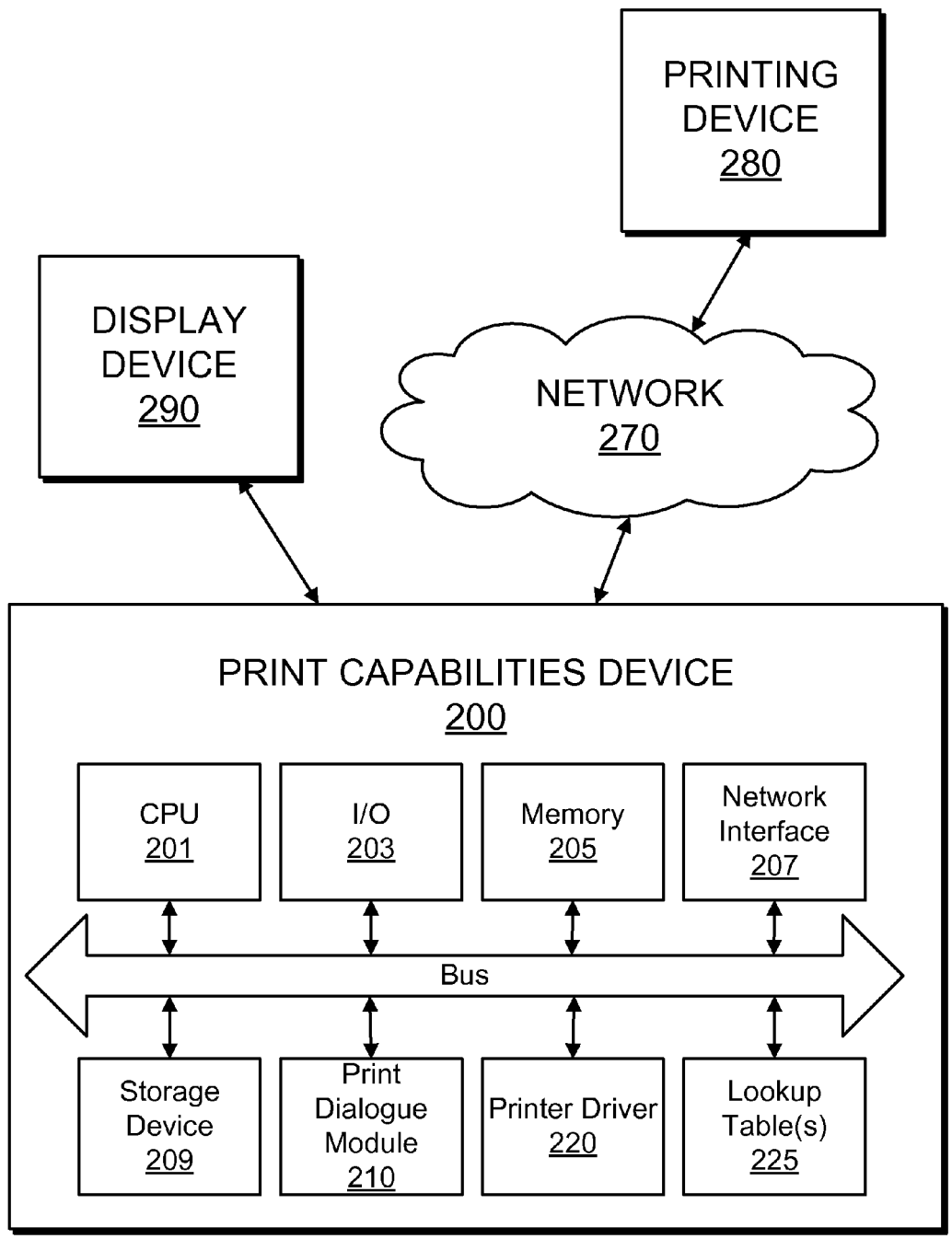
FIG. 2 is a block diagram illustrating an embodiment of a print capabilities device.

FIG. 2 is a block diagram illustrating an embodiment of a print capabilities device 200 in communication with a display device 290 and a printing device 280. The print capabilities device 200 communicates with the printing device 280 via the network 270, and the print capabilities device 200 may also communicate with one or more other devices via the network 270 as well, such as the display device 290. The network 270 may include any combination of one or more networks, including the Internet, WANs, and LANs as well as any combination of wired or wireless networks.

The print capabilities device 200 includes one or more processors 201 (also referred to herein as "CPU 201"), which may be a conventional or customized microprocessor(s). The CPU 201 is configured to read and execute computer readable instructions, and the CPU 201 may command/and or control other components of the print capabilities device 200.

The print capabilities device 200 also includes I/O interfaces 203, which provide communication interfaces to other devices, including a keyboard, a display device, a mouse, a printing device, a touch screen, a light pen, an optical storage device, a scanner, a microphone, a camera, etc. The print capabilities device 200 additionally includes a memory 205, which may be volatile or non-volatile, such as ROM, RAM, and flash memory. The network interface 207 allows the print capabilities device 200 to communicate with the network 270. The storage device 209 stores data or modules and may include, for example, a hard drive, an optical storage device, a diskette, and/or a solid state drive. The components of the print capabilities device 200 are connected via a bus. The print capabilities device 200 includes an operating system, which manages one or more of the hardware, the processes, the interrupts, the memory, and the file system.

The print capabilities device 200 also includes a print dialogue module 210, a printer driver 220, and lookup table(s) 225. A module may be executed by the print capabilities device 200 to cause the print capabilities device 200 to perform certain operations, though for ease of description a module may be described as performing the operations. Modules may include logic and/or computer readable instructions and may be implemented in software, firmware, and/or hardware. In other embodiments, the print capabilities device 200 may include more or less modules, the modules may be combined into fewer modules, or the modules may be divided into more modules.

The print dialogue module 210 includes instructions that, when executed, cause the print capabilities device 200 to generate a print dialogue user interface that includes printing information, such as printing device settings, capabilities, and selected options. The user interface may include any combination of text and graphics and may receive data from a user, such as via a text field or by user selection of a control on the interface (e.g., a menu, button, check box). As discussed above, the printer driver 220 communicates with a printing device (e.g., printing device 280). In the embodiment shown in FIG. 2, the print capabilities device 200 also includes lookup table(s) 225. The lookup table(s) 225 includes information about printing device settings and capabilities, and the print capabilities device 200 may use the lookup table(s) 225 to determine the printing device capabilities.

For example, the lookup table(s) 225 may map selected print options to print capabilities (e.g., map a PrintTicket to a PrintCapabilities and/or map a DevMode to a DevCaps). The lookup table(s) 225 may include a column for each setting (e.g., media size, media type, color, duplexing, stapling, font) and each capability and row for each permutation of setting options, and a row of the lookup table may indicate the printing capabilities for a printing device when the printing device is set to the settings options indicated in the respective row. In other embodiments, the print capabilities device 200 determines changes in print capabilities by other means, including logic, data trees, etc.

Figure 3:
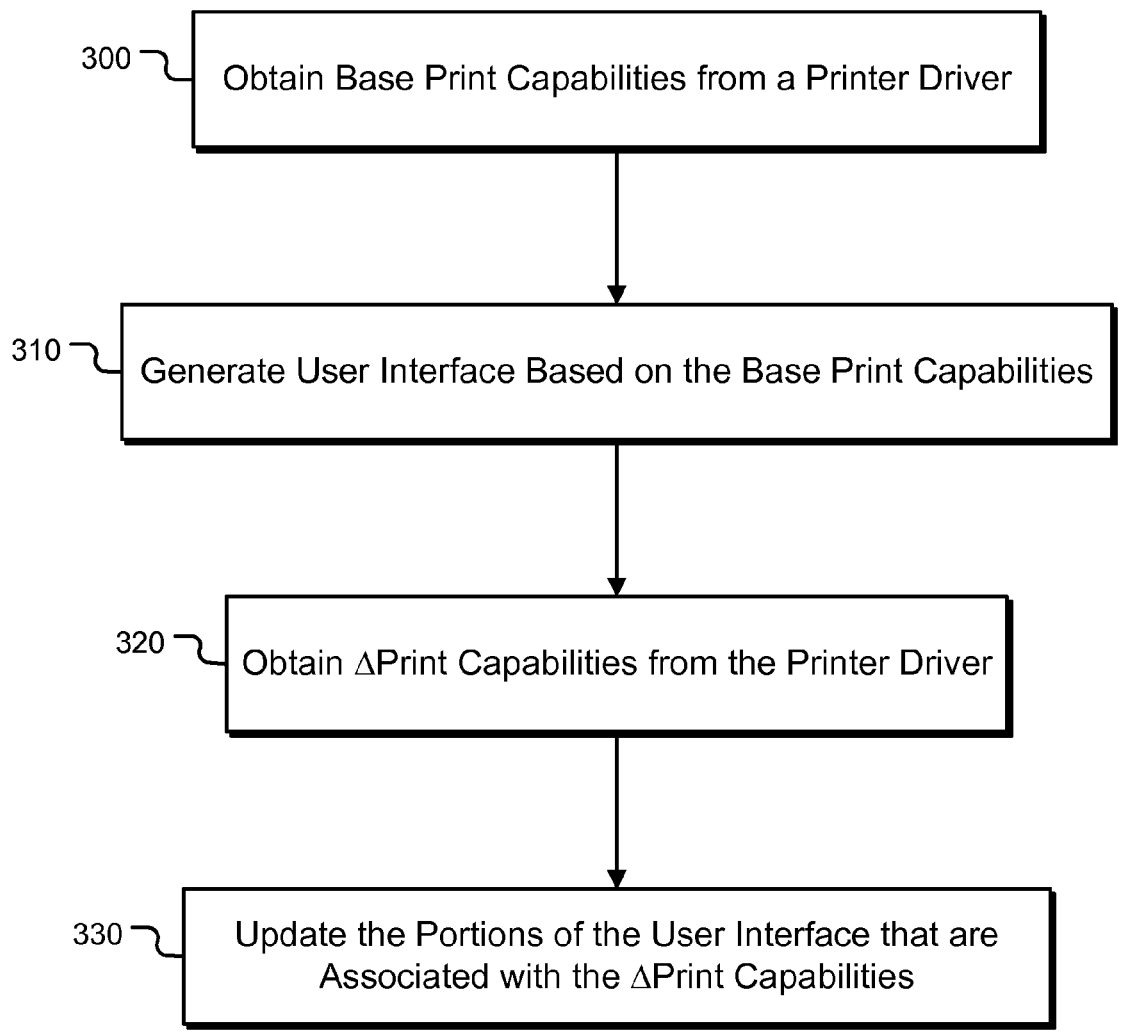
FIG. 3 is a flowchart illustrating an embodiment of a method for updating the capabilities of a printing device on a user interface.

FIG. 3 is a flowchart illustrating an embodiment of a method for updating the capabilities of a printing device on a user interface. Other embodiments of this method and the other methods described herein may omit blocks, may add blocks, may change the order of the blocks, may combine blocks, and/or may divide blocks into separate blocks. Additionally, one or more components of the print capabilities device 200 (e.g., the print dialogue module 210, the printer driver 220, the lookup table(s) 225) may implement the method shown in FIG. 3 and the other methods described herein.

Beginning in block 300, base print capabilities are obtained from the printer driver. For example, the printer driver may generate capabilities data that indicates the base print capabilities of a printing device based on received data (e.g., base print options) and return the capabilities data (e.g., an object, a file, a pointer, a data structure) to an application and/or device. The received data and the capabilities data may include markup language data, for example a PrintCapabilities (also referred to herein as "PC") and/or a PrintTicket (also referred to herein as "PT"). Next, in block 310, a user interface is generated based on the base print capabilities. The user interface may be presented to a user via a display device.

Moving to block 320, Δprint capabilities, which show changes to the print capabilities relative to the previous print capabilities (e.g., the base print capabilities), are obtained from the printer driver. The printer driver may receive updated print settings and, in response, generate data that contains substantially only the Δprint capabilities and return the data to an application and/or device. Also, the printer driver may include the Δprint capabilities in data that includes more than the Δprint capabilities and add one or more indicators to the data to identify the Δprint capabilities.

Finally, in block 330, portions of the user interface that are associated with the Δprint capabilities are updated. For example, the user interface may have one or more fields that are associated with respective print capabilities, and when a print capability is modified, the respective fields on the user interface are updated, and one or more other fields that are not associated with the Δprint capabilities are maintained.

Figure 4:
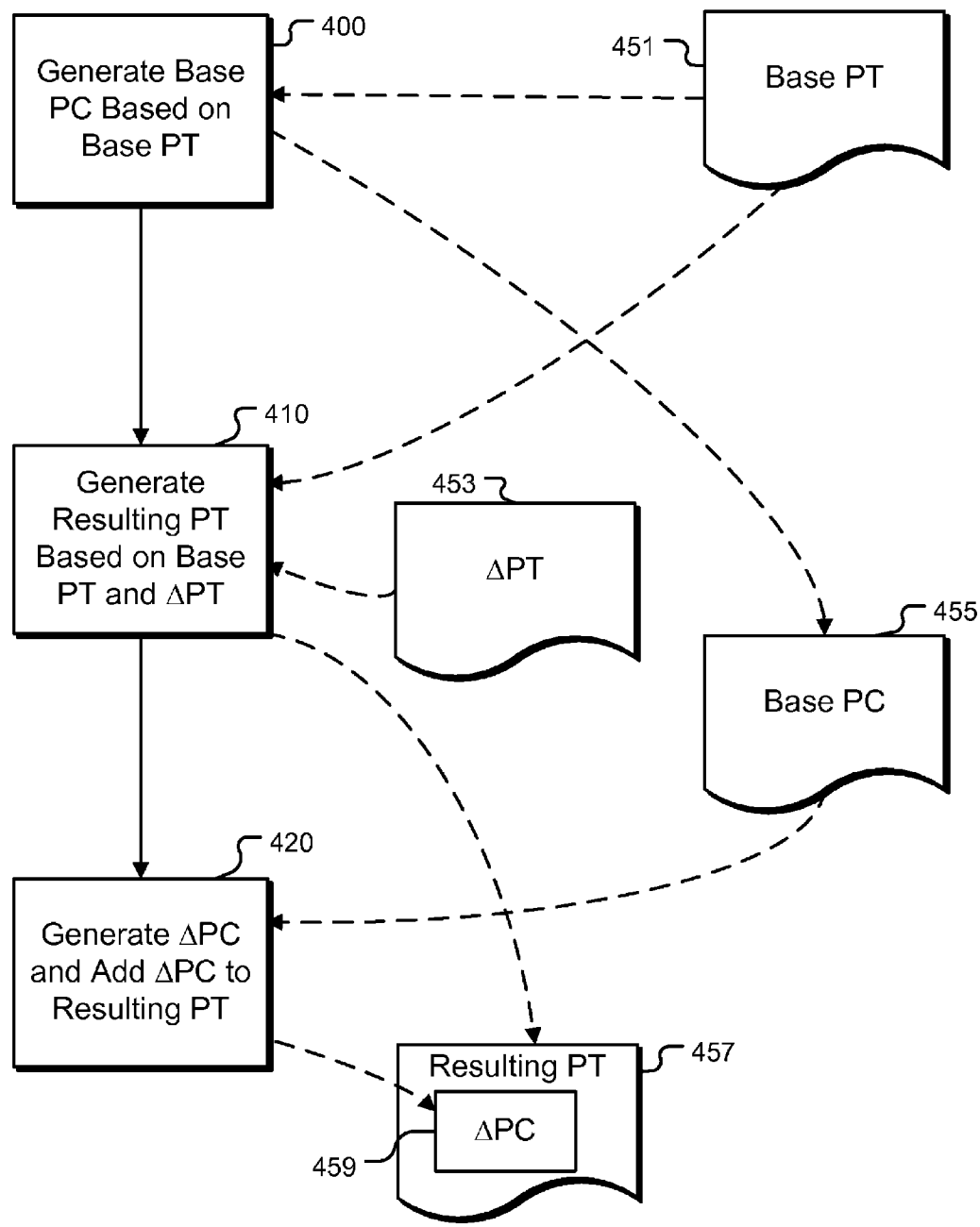
FIG. 4 is a flowchart illustrating an embodiment of a method for generating data indicating one or more changes to the capabilities of a printing device.

FIG. 4 is a flowchart illustrating an embodiment of a method for generating indicators of one or more changes to the capabilities of a printing device. Beginning in block 400, a base PC 455 is generated based on a base PT 451. For example, a printer driver is configured with information about the printing settings and printing capabilities of the printing device (e.g., all of the printing capabilities and the particular printing capabilities of the printing device while the printer settings are configured to selected options), and the printer driver generates the base PC 455 after receiving the base PT 451 from a calling application.

Next, in block 410, a resulting PT 457 is generated based on the base PT 451 and a ΔPT 453. The generation of the resulting PT 457 may include merge and validate operations. The merge operation combines the base PT and the ΔPT into a resulting PT 457, and the validate operation verifies that the printing device can implement the functionality described by the options selected for the settings in the resulting PT 457.

Finally, in block 420, a ΔPC 459 is generated based on the base PC 455 and updated print capabilities that are determined based on the resulting PT 457. The ΔPC 459 is added to the resulting PT 457. For example, the ΔPC 459 may be added to a resulting PT 457 by including the ΔPC 459 and tags (e.g., markup language tags) in that indicate the ΔPC 459, and/or the ΔPC 459 may be stored in a predetermined location in the resulting PT 457. The resulting PT 457 (including ΔPC 459) may be provided to an application or device.

Accordingly, when an application or a device requests the generation of a resulting PT 457 (such as a request sent to a printer driver), it will receive a resulting PT 457 and a ΔPC 459 in return. Thus, the application or device that receives the ΔPT 457 does not need to call an update capabilities function to determine updated print capabilities. For example, in some embodiments the base PT 451 and the ΔPT 453 are sent to a driver via a MergeAndValidate (Base PT, ΔPT) function call and the driver returns a resulting PT 457 that includes the ΔPC 459, thus allowing an application and/or device to communicate with the driver via an API specified by Windows®. Additionally, the base PT or the ΔPT sent to the driver may include the base PC 455, or the driver may store the base PC and/or retrieve it from a predetermined location in memory.

Figure 5:
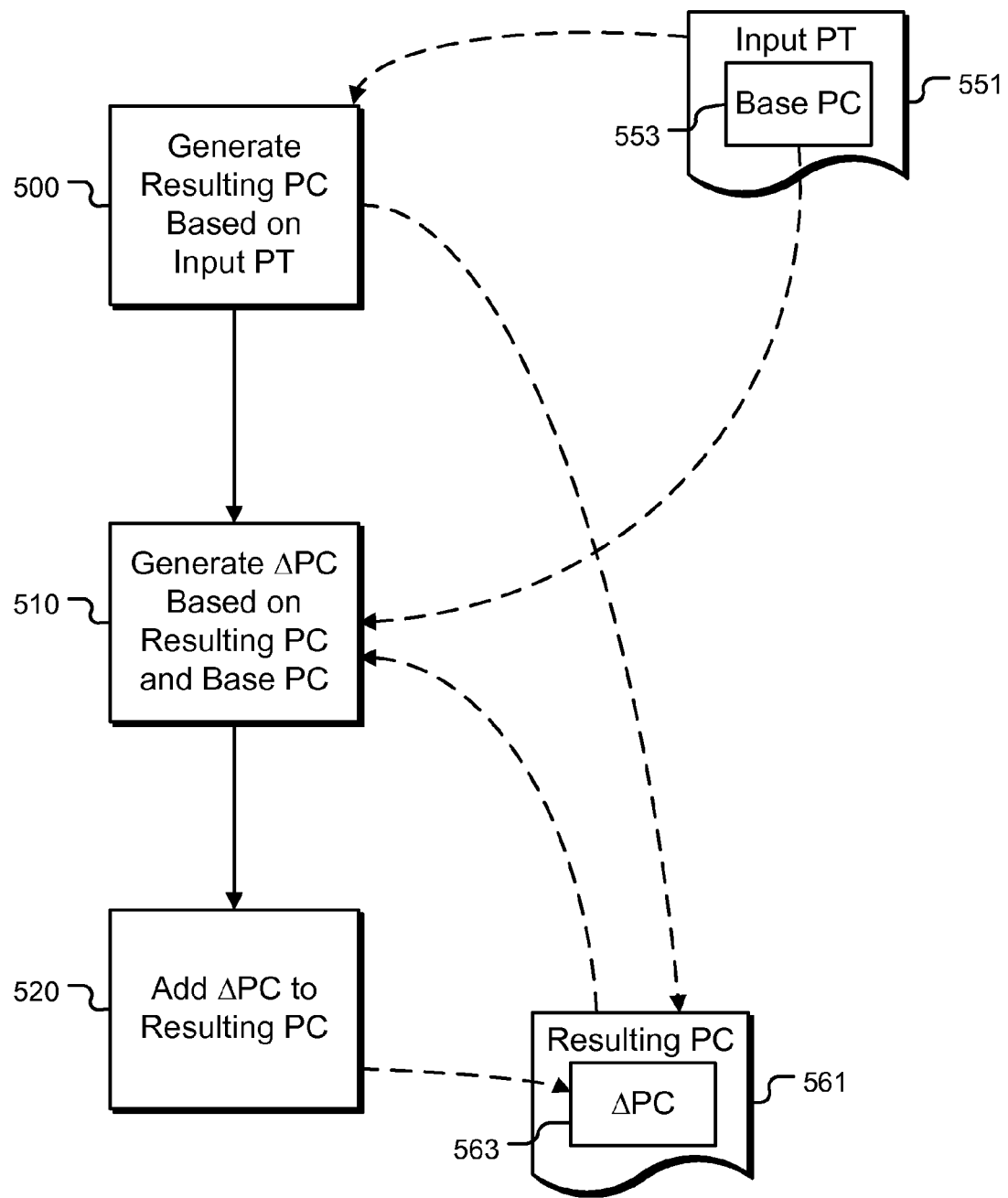
FIG. 5 is a flowchart illustrating an embodiment of a method for generating data indicating one or more changes to the capabilities of a printing device.

FIG. 5 is a flowchart illustrating an embodiment of a method for generating indicators of one or more changes to the capabilities of a printing device. Beginning in block 500, a resulting PC 561 is generated based on an input PT 551. In the embodiment shown, the input PT 551 includes a base PC 553, though in other embodiments the base PC 553 may have been generated and saved in response to receiving a previous PT 551. Including the base PC 553 with the input PT 551 allows the base PC 553 to be passed to a driver in a GetPrintCapabilities (Input PT) function call, thus allowing the driver to receive the base PC 553 while allowing the function call to comply with the interface required by GetPrintCapabilities as defined by APIs specified by Windows® (e.g., the PrintTicket API).

Next, in block 510, a ΔPC 563 is generated based on the resulting PC 561 and the base PC 553. Finally, in block 520, the ΔPC 563 is added to the resulting PC 561. For example, the ΔPC 563 may be added to a resulting PC 561 by including the ΔPC 563 and tags (e.g., markup language tags) in that indicate the ΔPC 563, and/or the ΔPC 563 may be stored in a predetermined location in the resulting PC 561.

In some embodiments, a printer driver is configured to determine the capabilities of the respective printing device when the printing device is configured to the selected settings options in the input PT 551. The printer driver may receive the input PT 551 in a function call, generate the resulting PC 561, such as by accessing an internal repository of data (e.g., lookup tables, stored logic) regarding the settings and capabilities of the printing device, and determine the ΔPC 563. The printer driver adds the ΔPC 563 to the resulting PC 561 and returns the resulting PC 561 to a calling application/device. Thus, the calling application/device will receive both the resulting PC 561 and the ΔPC 563 in response to a request to generate the resulting PC 561 for an input PT 551.

Figures 6A, 6B, 6C:
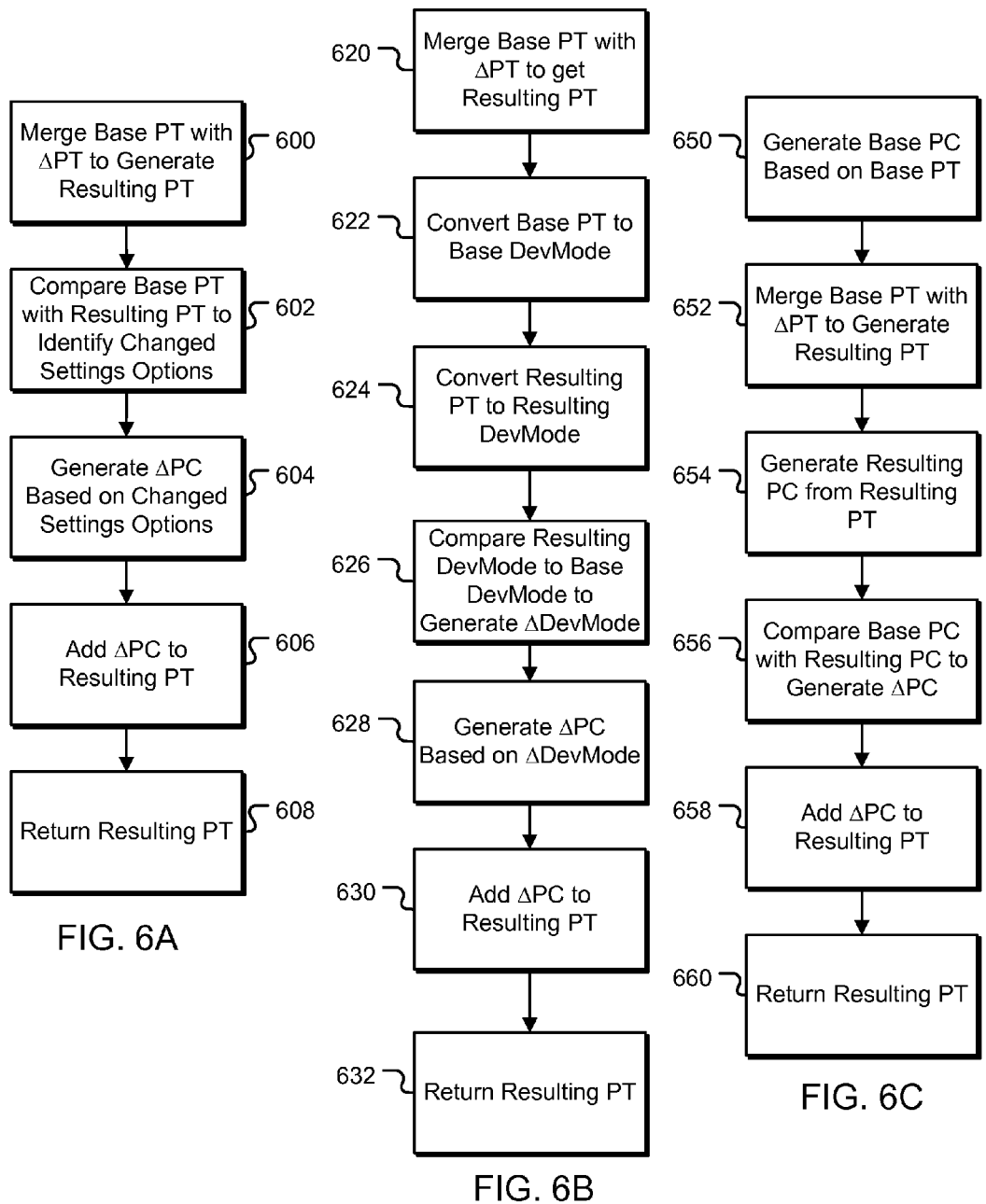
FIGS. 6A-6C are flowcharts that illustrate embodiments of methods for determining changes to the capabilities of a printing device.

FIGS. 6A-6C are flowcharts that illustrate embodiments of methods for determining changes to the capabilities of a printing device. In FIG. 6A, the flowchart begins with block 600. In block 600, a base PT is merged with a ΔPT to generate a resulting PT. Proceeding to block 602, the base PT is compared with the resulting PT to identify changed settings options. Next, in block 604, a ΔPC is generated based on the changed settings options. For example, in one embodiment the highest priority setting whose respective option(s) has been changed are determined, the lower priority settings that are affected by the change are determined, and the capabilities of the affected settings are added to the ΔPC. One or more lookup tables may be used generate the ΔPC, such as lookup tables that indicate higher and lower priority settings and that map changes in selected options of higher priority settings to changes in capabilities in lower priority settings. Moving to block 606, the ΔPC is added to the resulting PT, and in block 608 the resulting PT is returned.

In FIG. 6B, the flowchart begins with block 620, where a base PT is merged with a ΔPT to get a resulting PT. Next, in block 622, the base PT is converted to a base DevMode. Moving to block 624, the resulting PT is converted to a resulting DevMode. In block 626, the resulting DevMode is compared with the base DevMode to generate a ΔDevMode. Because a DevMode structure represents data in a binary format, the comparison may be a binary comparison, which can be performed faster than a comparison that requires parsing (e.g., a comparison of markup language data).

Moving to block 628, a ΔPC is generated based on the ΔDevMode. For example, one or more lookup tables may be used to map the changes to the selected settings options in the ΔDevMode to one or more changes in a DevCaps structure, and the one or more changes in the DevCaps structure may then be used to generate the ΔPC. Additionally, the resulting DevMode may be used to generate a resulting DevCaps and the base DevMode may be used to generate a base DevCaps. The ΔPC may then be generated by comparing the resulting DevCaps and the base DevCaps. Proceeding to block 630, the ΔPC is added to the resulting PT. Finally, in block 632, the resulting PT is returned.

In FIG. 6C, the flowchart begins in block 650, where a base PC is generated based on a base PT. Next, in block 652, the base PT is merged with a ΔPT to generate a resulting PT. Moving to block 654, a resulting PC is generated from the resulting PT. Then, in block 656, the base PC is compared with the resulting PC to generate a ΔPC. Proceeding to block 658, the ΔPC is added to the resulting PT, and in block 660 the resulting PT is returned.

Figure 7A:
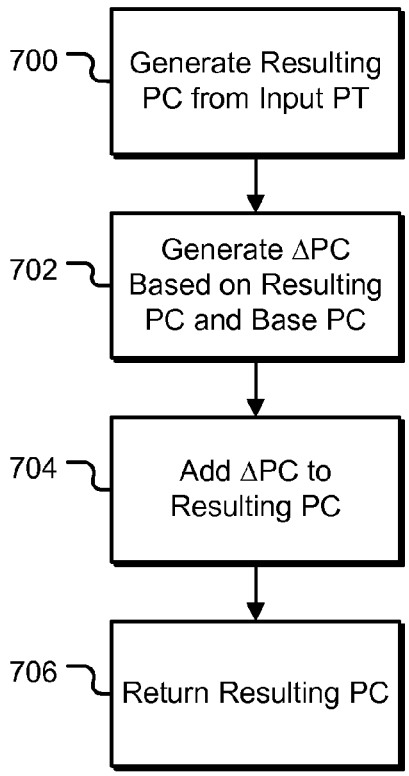
FIGS. 7A-7B are flowcharts that illustrate embodiments of methods for determining changes to the capabilities of a printing device.
Figure 7B:
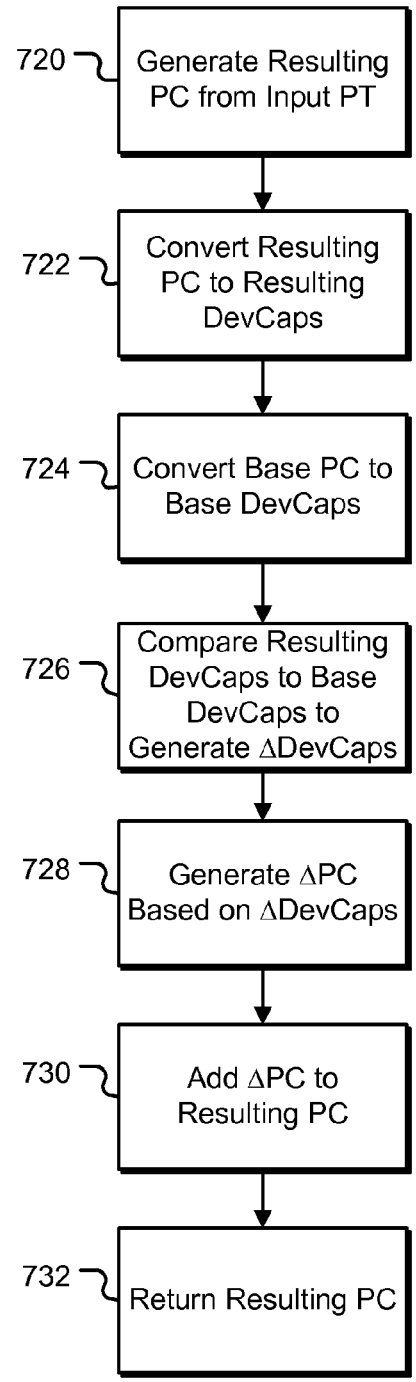

FIGS. 7A-7B are flowcharts that illustrate embodiments of methods for determining changes to the capabilities of a printing device. In FIG. 7A, the flowchart begins at block 700, where a resulting PC is generated from an input PT. Moving to block 702, a ΔPC is generated based on the resulting PC and the base PC. For example, the ΔPC may be generated by parsing and comparing the resulting PC and the base PC and/or by converting the resulting PC and the base PC into DevCaps and comparing the DevCaps structures. Next, in block 704 the ΔPC is added to the resulting PC. Finally, in block 706 the resulting PC is returned.

In FIG. 7B, the flowchart begins at block 720, where a resulting PC is generated from an input PT. Proceeding to block 722, the resulting PC is converted to a resulting DevCaps. Then, in block 724, a base PC is converted to a base DevCaps. Next, in block 726, the resulting DevCaps is compared to a base DevCaps to generate a ΔDevCaps. Because a DevCaps represents printing capabilities in binary form, the DevCaps comparison is a binary comparison, which may be performed faster than a comparison that requires parsing. Proceeding to block 728, a ΔPC is generated based on the ΔDevCaps. In block 730 the ΔPC is added to the resulting PC. Finally, the resulting PC is returned in block 732.

Figure 8:
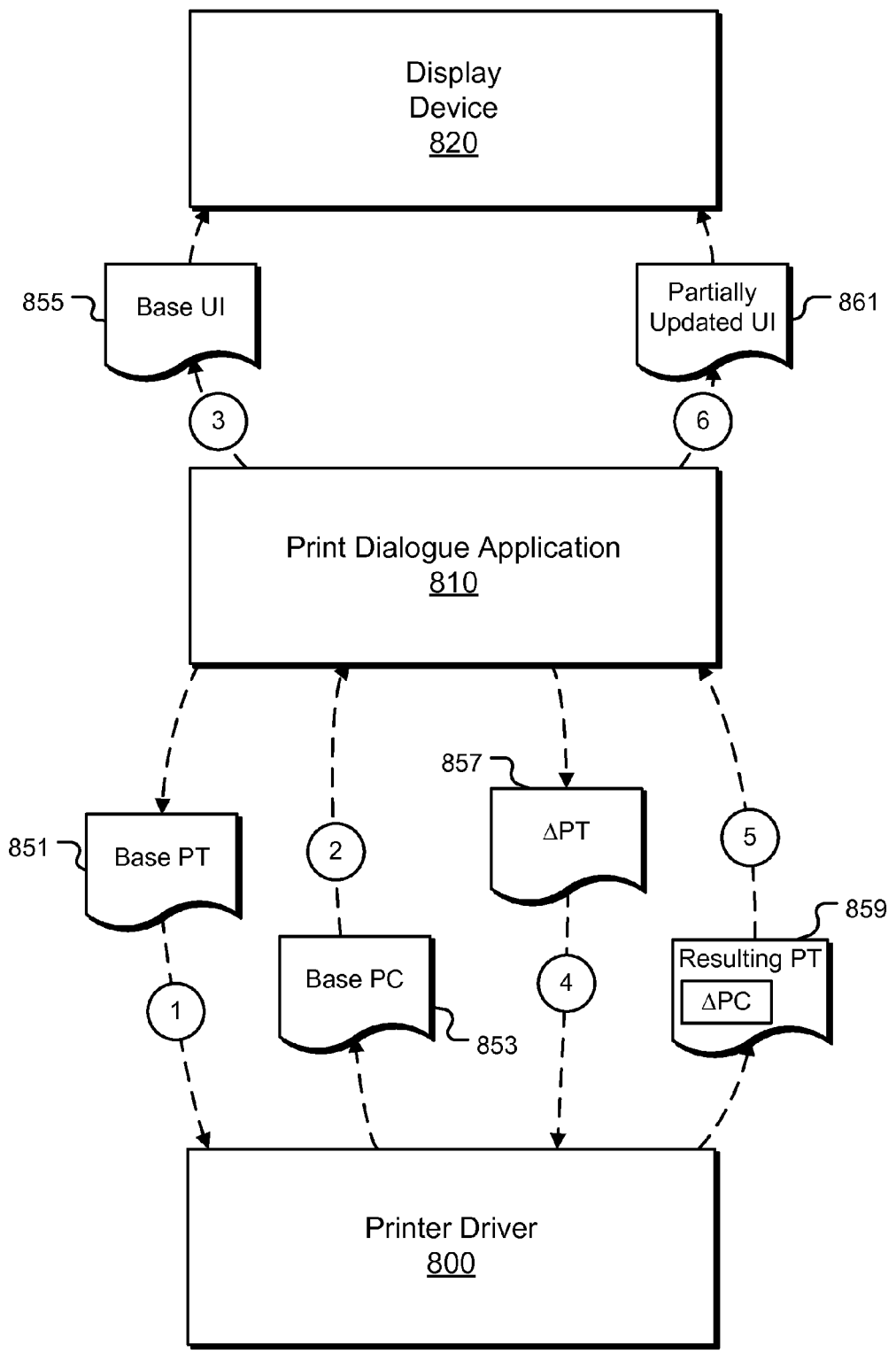
FIG. 8 is a flow diagram illustrating an embodiment of a system for generating updates about the capabilities of a printing device and the flow of data in the system.

FIG. 8 is a flow diagram illustrating an embodiment of a system for generating updates about the capabilities of a printing device and the flow of data in the system. In Stage 1, a print dialogue application 810 transmits a base PT 851 to a printer driver 800. The printer driver 800 generates and returns a base PC 853 to the print dialogue application in stage 2. Next, in stage 3, the print dialogue application 810 generates a base UI 855 and transmits it to a display device 820. In stage 4, the print dialogue application 810 generates a ΔPT 857 (which, in some embodiments, includes the Base PC 853) and transmits it to the printer driver 800. In stage 5, the printer driver 800 generates a resulting PT 859 that includes a ΔPC and transmits it to the print dialogue application 810. Finally, in stage 6, based on the ΔPC the print dialogue application 810 generates a partially updated UI 861 and transmits the partially updated UI 861 to the display device 820.

The above described systems and methods can be achieved by supplying a storage medium having computer-executable instructions for realizing the above described operations to one or more computing devices (e.g., CPU, MPU) that may read the computer-executable instructions stored in the storage medium and execute them.

In this case, the computer-executable instructions when read from the storage medium and performed by the one or more computing devices execute the operations of the above described embodiments. Thus, the computer-executable instructions or the storage medium storing the computer-executable instructions therein constitute an embodiment.

Any applicable computer-readable storage medium (e.g., a floppy disk, a hard disk, an optical disk, a magneto-optical disk, a CD-ROM, a CD-R, a magnetic tape, a non-volatile memory card, and a ROM) can be employed as a storage medium for supplying the computer-executable instructions.

The computer-executable instructions may be written to a memory provided on a function-extension board inserted into the computing device or on a function-extension unit connected to the computing device, and a CPU provided on the function-extension board or unit may carry out part or all of the actual processing that realizes the operations of the above-described embodiments.

When the computer-executable instructions are executed by the one or more computing devices, not only are the above described operations of the embodiments realized, but also an operating system working on the computing system may carry out part or all of the actual processing that realizes the operations of the above described embodiments.

While the above disclosure describes illustrative embodiments, it is to be understood that the invention is not limited to the above disclosure. To the contrary, the invention covers various modifications and equivalent arrangements within the spirit and scope of the appended claims.

What is claimed is:

1. A device which can communicate with a printer, the device comprising:
   a storage device;
   a processor; and
   a printing device driver that is configured to
      obtain first print settings data from a print dialogue application, wherein the first print settings data includes first selected options for print settings of a printing device;
      generate first print capabilities data indicating first print capabilities of the print settings of the printing device based on the first selected options for the print settings of the printing device;
      send the first print capabilities data to the print dialogue application;
      obtain second print settings data from the print dialogue application, wherein the second print settings data includes second selected options for the print settings of the printing device, and wherein the second selected options for the print settings include at least one second selected option for a print setting that is different than the first selected option for the print setting in the first print settings data;

generate second print capabilities data indicating second print capabilities of the print settings of the printing device based on the second selected options for the print settings;

generate updated print settings data based on the first print settings data and on the second print setting data;

generate delta print capabilities data based on the first print capabilities data that was generated by the device driver and on the second print capabilities data;

add the delta print capabilities data to the updated print settings data; and send the updated print settings data, which includes the delta print capabilities data, to the print dialogue application.

2. The device of claim 1, wherein the first print settings data is a PrintTicket.

3. The device of claim 2, wherein the first print capabilities data is a PrintCapabilities.

4. The device of claim 1, wherein the printing device driver is further configured to obtain the second print settings data with a request for updated print settings that is received from the print dialogue application.

5. The device of claim 1, wherein the printing device driver is further configured to obtain the first print capabilities data from the print dialogue application with the second print settings data and after the printing device driver has sent the first print capabilities data to the print dialogue application.

6. The device of claim 5, wherein the printing device driver is further configured to obtain the first print capabilities data and the second print settings data with a request for updated print capabilities that is received from the print dialogue application.

7. The device of claim 5, wherein the printing device driver is further configured to obtain the first print capabilities data and the second print settings data with a request for updated print settings that is received from the print dialogue application;

additionally obtain the first print settings data with the request for updated print settings; and send the updated print settings data, which includes the delta print capabilities data, to the print dialogue application in reply to the request for updated print settings.

8. A non-transitory computer-readable medium storing a program that causes a computing device to perform operations comprising:

obtaining first print settings data from a print dialogue application, wherein the first print settings data includes first selected options for print settings of a printing device;

generating first print capabilities data indicating first print capabilities of the print settings of the printing device based on the first selected options for the print settings of the printing device;

sending the first print capabilities data to the print dialogue application;

obtaining second print settings data from the print dialogue application, wherein the second print settings data includes second selected options for the print settings of the printing device, and wherein the second selected options for the print settings include at least one second selected option for a print setting that is different than the first selected option for the print setting in the first print settings data;

generating second print capabilities data indicating second print capabilities of the print settings of the printing device based on the second selected options for the print settings;

generating updated print settings data based on the first print settings data and on the second print settings data;

generating delta print capabilities data based on the first print capabilities data that was generated by the device driver and on the second print capabilities data;

adding the delta print capabilities data to the updated print settings data; and sending the updated print settings data, which includes the delta print capabilities data, to the print dialogue application.

9. The non-transitory computer-readable medium of claim 8, wherein the operations further comprise after sending the first print capabilities data to the print dialogue application, obtaining the first print capabilities data from the print dialogue application with the second print settings data and with a request for updated print settings.

10. The non-transitory computer-readable medium of claim 8, wherein the operations further comprise obtaining the second print settings data with a request for updated print settings that is received from the print dialogue application; and sending the updated print settings data, which includes the delta print capabilities data, to the print dialogue application in reply to the request for updated print settings.

* * * * *